United States Patent [19]

Tendler

[11] Patent Number: 4,916,674
[45] Date of Patent: Apr. 10, 1990

[54] METHOD AND APPARATUS FOR IMPROVING THE SHALLOW WATER PERFORMANCE OF A DEPTH SOUNDER

[76] Inventor: Robert K. Tendler, 19 Lawrence Ave., Chestnut Hill, Mass. 02167

[21] Appl. No.: 334,455

[22] Filed: Apr. 6, 1989

[51] Int. Cl.[4] ............................................. G01S 15/00
[52] U.S. Cl. ..................................... 367/141; 367/99; 181/124; 181/402
[58] Field of Search ............... 181/123, 124, 140, 402; 367/99, 106, 141, 908; 73/290 V

[56] References Cited

U.S. PATENT DOCUMENTS

| | | | |
|---|---|---|---|
| 837,551 | 12/1906 | Ells | 181/124 |
| 1,649,378 | 11/1927 | Behm | 181/124 |
| 1,735,460 | 11/1929 | Hahnemann et al. | 181/124 |
| 4,101,865 | 7/1978 | Schurr | 367/908 |

Primary Examiner—Brian S. Steinberger

[57] ABSTRACT

Acoustic delay means are interposed between the face of a transducer and the bottom of a vessel, with the delay being equal to or greater than the shallowest depth the associated depth sounder capable of, whereby subtracting out the depth associated with the acoustic delay, the water under the vessel can be measured down to zero feet. In a preferred embodiment, a water column is utilized as the delay media, with the transducer being mounted at the top of the water column and with the water column being terminated at the bottom of the boat. The transducer pulses are projected through the water/hull/water interface to the water beneath the vessel. For digital depth sounders, the depth associated with the water column may be subtracted out to give the zero reading.

7 Claims, 3 Drawing Sheets

METHOD AND APPARATUS FOR IMPROVING THE SHALLOW WATER PERFORMANCE OF A DEPTH SOUNDER

FIELD OF THE INVENTION

This invention relates to depth sounders and more particularly to a method and apparatus for improving the shallow water performance of depth sounders.

BACKGROUND

In the past, it has only been with difficulty that the shallow water range of the depth sounder can be brought below, for instance, 2.6 feet. As boaters are used to navigating in water having a depth of only inches, this limitation on the shallow water response of the depth sounder is troublesome.

In essence, for all depth sounding systems in which acoustic pulses are projected into the water by a transducer, the depth is limited by the length of the transmitted pulse, and the response or settling time of the receiver elements and the transducer itself. For instance, for a 200 micro-second pulse, the equivalent depth is about 0.5 feet. If one is not to detect the trailing edge of the transmitted pulse, one cannot open up the receiver section of the depth sounder earlier than 200 microseconds; or equivalently half a foot. Additionally, transducer ring, after activation, is approximately 80 microseconds and at 200 KHZ, and transducer activation takes 50 micro-seconds. More importantly, receiver tank circuits and circuit delays account for almost the equivalent of two additional feet in delay. The result is a loss of almost 2.6 feet off the range of most depth sounders. This, therefore, describes a fundamental shallow water limitation on all depth sounding systems.

In an effort to improve the shallow water performance, depth sounders have been given shorter and shorter transmit pulses, as well as reduced output power. In so doing, while it is possible to obtain a depth sounder which will provide readings down to 0.9 feet, the shortening of the transmit pulse and the power reduction makes the entire system extremely unstable and subject to not only ignition noise, but also to turbulence, weeds, under-water growth and sharp underwater structure changes.

In summary, the shallow water response of the depth sounder is limited to the transmit pulse length at the very least, and more importantly to the ringing time or stabilization time of the circuits utilized to receive the sonic pulses.

SUMMARY OF THE INVENTION

In contra-distinction to providing better shallow water performance by reducing of the transmit pulse length and power, in the subject invention means are provided to permit the depth sounder range to go to zero by providing an acoustic delay of the pulses transmitted from the face of the transducer. The acoustic delay is equal to or greater than the inherent cumulative delays associated with the depth sounding system. Typically, the acoustic delay provided may be equivalent to the aforementioned 2.6 feet of depth. Means are provided to subtract out this depth from the depth to be indicated by the depth sounder. Thus, a zero depth reading is now possible despite inherent delays in the depth sounder system.

This delay can be produced by a water column, with the transducer mounted at the top of the water column. The shape of the pipe providing the water columns may be cylindrical; or the lower end may be fluted in an exponential fashion, like a trumpet bell, to eliminate reflections within the water column. The pipe can also be tuned to minimize reflections by slots or stubs. In fact, the water column can be given any configuration to minimize back reflections, including varying the material sealing the end of the column. While in one embodiment, the hull terminates the column, in another embodiment, a membrane serves to terminate the pipe. While the above may be beneficial, it has been found that terminating a six inch cylinder to the bottom of a fiberglass hull provides exceptional sensitivity with no discernable back reflections from the hull into the cylinder.

As to the length of the water column, assuming, for instance, a transmit pulse length of 200 micro-seconds and circuit delays equivalent to two feet of water depth, it would be appropriate to provide a water column in excess of 2.6 feet and to adjust the indication of depth by subtracting out the length of the water column from the indicated depth. The transducer signal is projected into the water column, through the interface between the water column and the hull, and through the water beneath the vessel so that traditional depth sounding can take place.

While the height of the water column is such as to eliminate the problems with pulse length and circuit delays due to settling time, there is also a relationship between the length of the water column and a so-called "blind" in which the depth sounder is blinded, for instance, between zero and three feet to ignore any spurious returns or to ignore noise due to transducer ring, settling time or surface noise at the hull of the vessel. With a two foot water column and a three foot blind, this would mean that the blind would extend from the hull down to one foot below the bottom of the hull. It will be appreciated that it is useful to blind the depth sounder to surface effects such as turbulence around the hull. In this case, the depth sounder would read to a minimum of one foot to eliminate the effects of turbulent flow around the hull. A one foot limit, as the lowest depth for the depth sounder, in most cases, is satisfactory for even those inclined to go into excessively shallow waters. In short, the blind of the receiver can be used to cancel out hull effects in the region where the blind exceeds the water column length.

What has been provided therefore is a means of depth sounding in which nothing is altered in the depth sounder itself other than the indication of depth, which is provided with an appropriate off-set to be subtracted from the depth indication. This means that conventional depth sounder receivers can be utilized without deleteriously affecting the shallow water range of the depth sounder.

It will be appreciated that the indicated range is the sensed range minus the off-set engendered by the delay device. It will also be appreciated that while it is convenient to have a water column as the delay medium for the subject system, other fluids between the transducer face and the bottom of the vessel can provide a useful delay without an excessive vertical dimension. If the vertical dimension is obtrusive, less dense fluids such as carbon tetrachloride and silicon fluoride may be used. If such less dense fluids are not available, assuming a transducer which is relatively directional, the transducer energy can be projected down a horizontal water-filled tube with a reflector at the end to reflect the radiation down through the water. This precludes the problem of having a vertically rising pipe two or three feet within the hull of the vessel.

Alternatively, any acoustic delay device between the transducer face and the hull may be utilized. Moreover, an electronic delay may be inserted into the transmission line. This delay is the partial equivalent of the water column and can effectively remove circuit delay caused range limitations, if no pulse length caused range limitations.

As an alternative, with vessels drawing a considerable amount of water, the transducer may be mounted at or near the hull at the surface of the water, and the distance between the face of the transducer and the bottom of the vessel subtracted from the indicated depth. This works well with barges which draw, for instance, nine feet. A transducer on a boom ahead of the barge at the water's surface is all that is necessary to effectuate depth indications down to zero. This is accomplished by merely subtracting out the draft of the barge.

In summary, acoustic delay means are provided between the face of a transducer and the bottom of a vessel, with the delay being equal to or greater than the equivalent depth of inherent delays in the depth sounding system, whereby, by subtracting out the equivalent depth, the water under the vessel can be measured down to zero feet. In a preferred embodiment, a water column is utilized as the delay media, with the transducer being mounted at the top of the water column and with the water column being terminated at the bottom of the boat. The transducer pulses are projected through the water/hull/water interface to the water beneath the vessel. For digital depth sounders, the depth associated with the water column may be subtracted out to give the zero reading.

BRIEF DESCRIPTION OF THE DRAWINGS

These and other features of the subject invention will be better understood when taken in conjunction with the Detailed Description and the Drawings of which.

DETAILED DESCRIPTION

Figure 1:
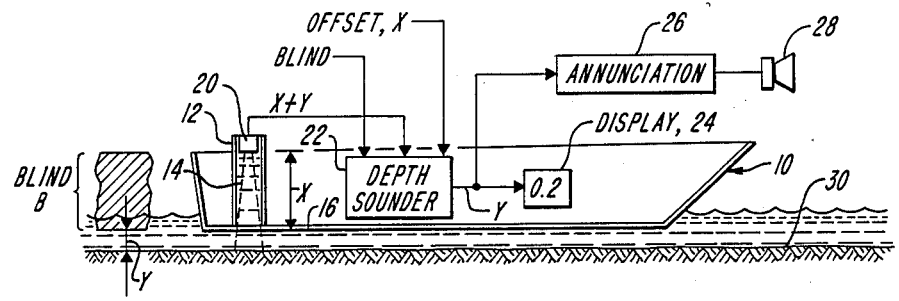
FIG. 1 is a diagrammatic illustration of the subject invention utilizing a delay medium in the form of a water column, in which the water column length is configured so that zero depth can be measured at the hull of the vessel.

Referring now to FIG. 1, the shallow water response provided by the subject system can be seen. In this diagram, the hull of a boat 10 is provided with a tube 12 which provides a water column 14 therein, with the tube or pipe being sealed to the hull 16 in any convenient fashion. At the top of the water column 14, is a transducer 20 which is coupled to a conventional depth sounder or finder 22 which is provided with an off-set control X and is provided with a blind to be described hereinafter. The output of depth sounder 22 is provided to a digital display 24 and also to a verbal annunciation circuit 26 which annunciates the depth provided by the depth sounder by a speaker 28.

As can be seen, vessel 10 is afloat above a bottom 30 which is within inches of the bottom of the hull. It will be appreciated that for vessels having transducers operated at or adjacent the hull, such a shallow depth would be impossible to detect due to the usual length of the transmit pulse as well as receiver settling time. The reason that the depth sounder would ordinarily not receive signals from so close in, is because the receiver portion of the depth sounder is inhibited or blinded for a predetermined period of time, usually on the order of a milli-second. As mentioned hereinbefore, for a transmit pulse of 200 micro-seconds, the equivalent depth is approximately 0.5 feet. Thus, even if the receiver of the depth sounder were opened at the exact end of the transmit pulse, the lower depth limit would of 0.5 feet. Allowing for transducer ring and settling time, as indicated hereinbefore, blinds are usually set to between 2.3 and 2.7 feet so that no transducer ring or any component of the transmit pulse will be detected by the receiver once the receiver section is opened up. This blind is illustrated by blind B in FIG. 1, and, for purposes of illustration, in order to detect zero depth, the blind is made to be exactly equal to the distance X, which is the distance from the face of transducer 20 to the hull 16 of the vessel.

In operation, when a pulse is transmitted via transducer 20, depth sounder 22 is blinded for the time equivalent of the depth of the water column, or the time it takes for the pulse to transit down the tube for distance X and then back up the tube for distance X. This makes the system non-responsive to any unwanted reverberations in the water tube. This being the case, and assuming the off-set for the depth sounder is set at the distance X, then it is possible to obtain a zero depth reading by merely subtracting out X from the output of the depth sounder. Thus, for instance, if the depth is X plus Y, by subtracting out X, one is left with Y which, as can be seen, can now be zero assuming the blind for the depth sounder is set at B=X. For purposes of illustration, it is assumed that 2/10ths of a foot of water exists beneath the hull 16 such that if X=3 and B=3 and Y=0.2, then X+Y=3.2 which is the detected depth. Subtracting out X=3, the result is an indicated depth of 0.2.

What has been provided is an acoustic system which does not alter the characteristics of the depth sounding system, with the exception of providing a physical acoustic delay between the face of the transducer and the hull of the boat. This acoustic delay may be provided by locating the transducer in a water column as illustrated, or in a column of some other fluid or gas. If the fluid or gas has an acoustic characteristic in which the sound therethrough is slower than the speed of sound through water, then the length of tubing or pipe may be reduced. This will reduce the height of the apparatus within the vessel, although albeit at some expense. Alternatively, any acoustic delay medium which can serve to provide for the requisite acoustic delay is usable in the subject invention.

Figure 2:
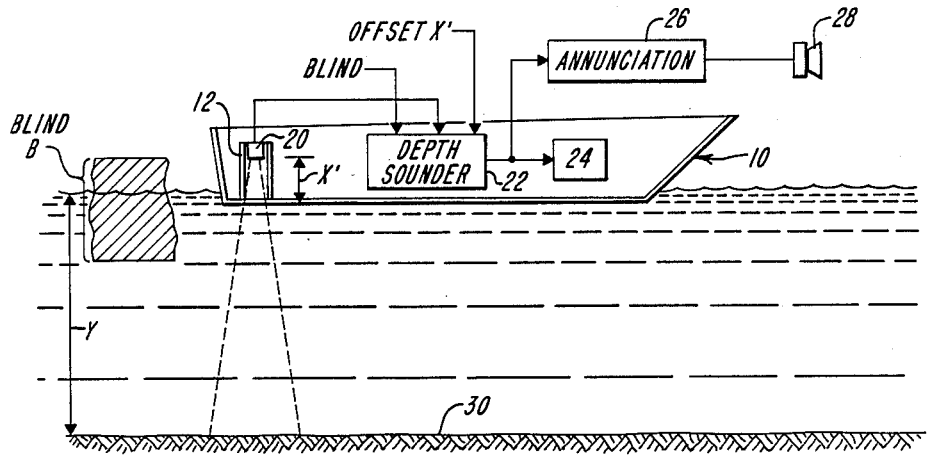
FIG. 2 is a diagrammatic illustration of the same situation in which the length of the water column and the depth sounder blind is adjusted so as to give a predetermined blind beneath the vessel before indicating returns therefrom.

Referring now to FIG. 2, it is possible by adjusting the transducer height X' to effectuate the movement of the blind downwardly into the water so that the depth sounder 22 is blinded, for instance, between the hull and six inches below the hull 16. Here, it can be seen that were one to wish to restrict out surface noise such as non-laminar flow about the hull, one would merely, utilizing the built-in blind for the depth sounder, reduce the height of the water column 12 to the point which lowers the blind 6 inches into the water. Typically, technique is useful to restrict returns in the region from the hull down to six inches. In any event, the depth ascertainable by the depth sounder is unaltered in that the depth is equal to $X'+Y-X'=Y$. However, the minimum range with $Y=0$ would be $R_{min}=B-X$. Thus, with a two foot transducer to hull distance and a three foot blind, the blind would extend down one foot beneath the bottom of the hull.

Figure 3:
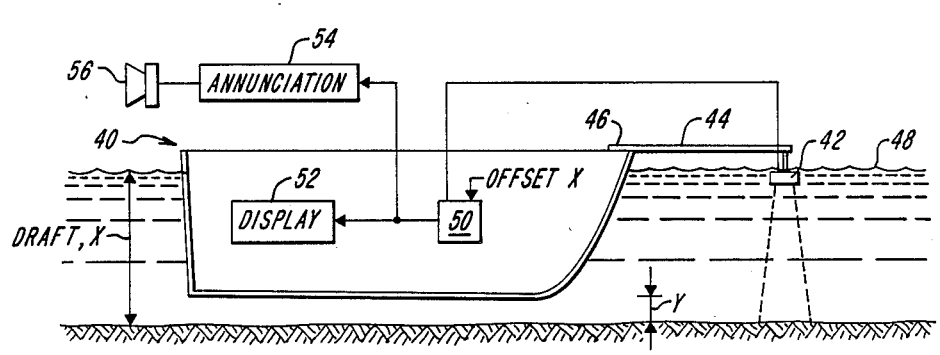
FIG. 3 is a diagrammatic illustration showing the use of the draft of a boat to provide the required water column delay.

Referring now to FIG. 3, the same system can be applied without the utilization of an internal water column. In this case, a barge 40 has a significant draft, in one case nine feet. Here, the draft X is thus equal to nine. A transducer 42 is mounted on a boom 44 projecting from the bow 46 of the barge, with the transducer being located at the water's edge 48. If the barge is running in six inches of water, this can be detected by merely providing the output of the transducer to a conventional depth sounder 50 having an off-set equal to the draft X, such that what is displayed is what is detected at the transducer. This is the depth Y, minus the off-set of nine feet, which yields a display of the depth Y at display unit 52. This depth may also be annunciated at unit 54 via speaker 56. In any event, the system operates identically to that described in connection with FIG. 2, with the exception that the delay medium is actually the water in which the vessel is located, with the water column being provided by the draft of the boat or barge.

Figure 4:
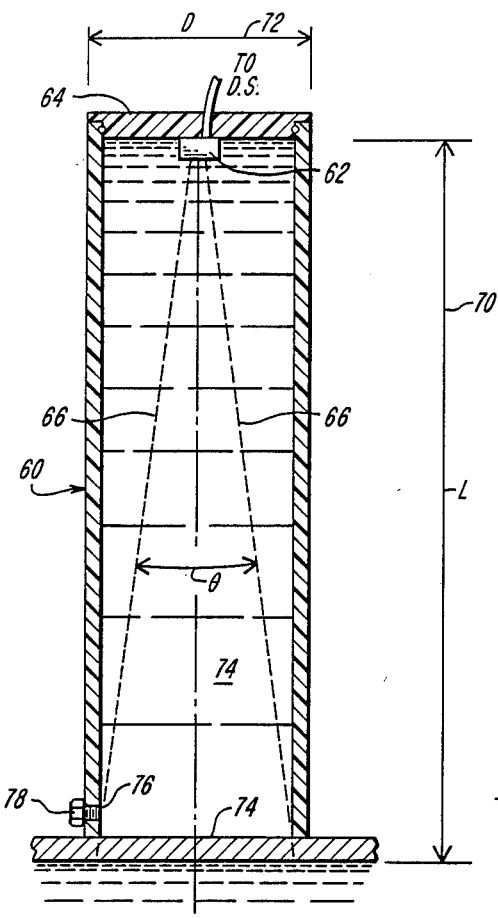
FIG. 4 is a cross-sectional view of a water tube for use in the subject invention indicating critical dimensions to eliminate unwanted reflections in the tube.

Referring now to FIG. 4, in one embodiment, it will be appreciated that a water tube 60 may be provided with a transducer 62 attached to a cap 64, in which the transducer has a beam pattern 66 generally indicated by $\theta$. If, for instance, the beam width of the transducer is 18°, then it is possible to adjust the length L indicated by double-ended arrow 70 such that the beam edges impinge upon and are co-extensive with the inside diameter of the tube, D, here indicated by double-ended arrow 72.

What will be appreciated is that by virtue of this configuration, reflections back from the inner surface 74 of the hull are minimized as well as reflections which might have occurred by virtue of the beam impinging upon the side walls of the tube. This minimizes tube-introduced interference and provides for the requisite delay nonetheless.

It will be appreciated that if the tube is filled with water as indicated at reference character 74, then a drain hole 76 should be provided at the base of the cylinder with a plug 78 removable so as to be able to drain the tube during the winter months.

Figure 5:
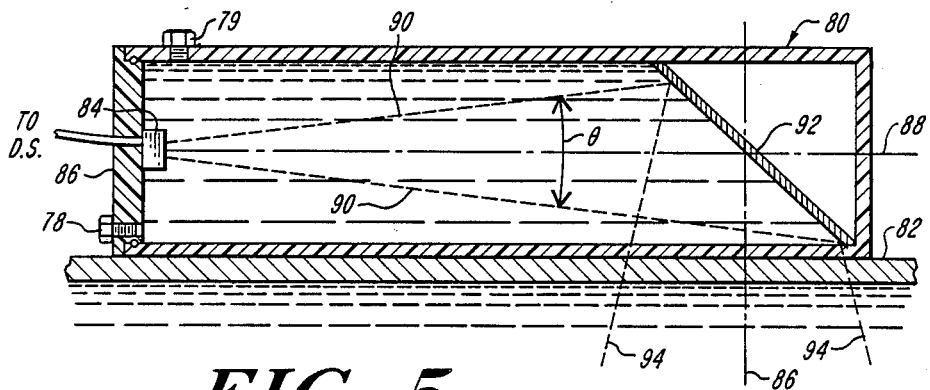
FIG. 5 is a cross-sectional view illustrating one embodiment of the water tube in which the tube lies in a horizontal position and is provided with a reflector.

Referring now to FIG. 5, it will be appreciated that a water tube 80 may be supplied in a recumbent position along the bottom 82 of a vessel. This configuration provides for minimal necessary vertical clearance while, at the same time, providing adequate delay for the acoustic signals. Here, a transducer 84 is located on a cap 86, with the transducer being aimed down the longitudinal center line 88 of tube 80. Here, the beam angle as indicated by dotted lines 90 which subtend an angle $\theta$. Interposed in the beam path is a reflector 92 which is angled, in one embodiment, at 45° to the center line of the tube. The beam is reflected as illustrated by dotted lines 94 through the bottom 82 of the vessel and into the water immediately therebeneath. This reflected beam system is useful in reducing the vertical height of the delay medium while, at the same time, providing all of the aforementioned functions. It will be appreciated that the beam direction is along line 86 which may be altered by rotation of the reflective element within the tube so as to accomodate different hull geometries. Note, a drain 78 and a fill hole 79 may be provided as shown.

Figure 6:
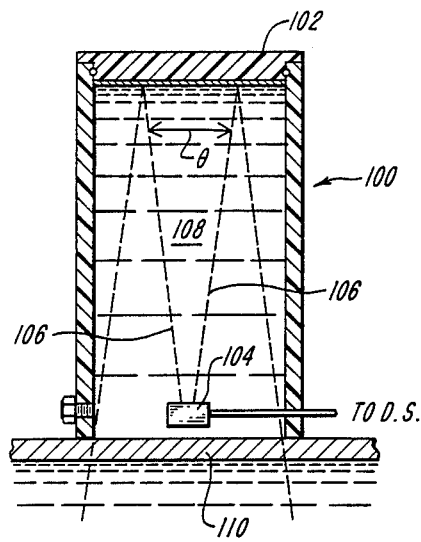
FIG. 6 is a cross-sectional view illustrating a folded beam water tube configuration.

Referring now to FIG. 6, an embodiment is shown in which the vertical height of the water tube may be reduced by half through a folded beam pattern. Here, water tube 100 is provided with a reflector 102, with a transducer 104 being mounted at or adjacent the bottom of the tube. The projected beam as illustrated at 106 is projected upwardly to reflector 102 wherein it is reflected back down through the water 108 within the tube and then out the bottom 110 of the vessel's hull and into the water. It will be appreciated that the travel path through the aquatic medium is the same as using a double length tube. However, by virtue of the folding, the vertical height of the tube can be minimized for convenience.

Reflector 102 can have a plane surface as illustrated or can be curved in any fashion so as to focus the radiation in an appropriate manner so as to provide and optimal beam width from the structure provided and also optimum efficiency or gain for the system.

Figure 7:
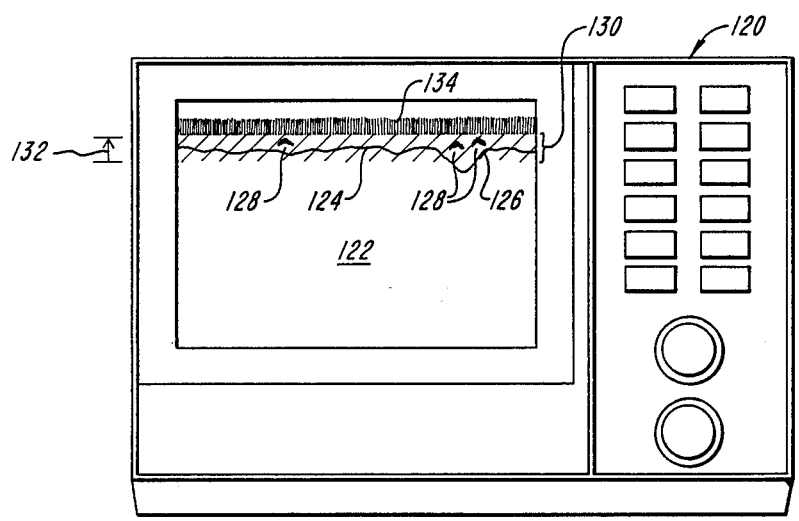
FIG. 7 is a front view of a chart recorder type depth sounder illustrating the ability to determine shallow water structure using the subject technique.

Referring now to FIG. 7, the practical effect of the subject invention on a graph type depth sounder is illustrated. Here, a chart recorder generally indicated by reference character 120 is illustrated as having a paper chart 122 in which the bottom structure is illustrated by line 124 to include, inter alia, a small trench 126. Above the bottom are indications 128 of fish.

As will be appreciated, were it not for the subject system this entire bottom structure would be obscured by interference caused by the aforementioned transducer ringing, receiver settling time and, in deed, by the length of the transmit pulse. This would ordinarily mask off an area beneath the hull of up to 2.6 feet. This area is illustrated by the hatched section 130 which, as illustrated, would completely obscure or mask the bottom structure of any fish above the bottom.

The subject delay medium, whether it be a water tube or other device, shifts this interference upwardly as illustrated by arrow 132 such that the typical thick zero line as illustrated at 134 would be shifted such that, in one embodiment, the bottom of this line would correspond to the bottom of the hull of the vessel. Were the subject system not utilized, this zero line would extend from the face of the transducer downwardly for as much as 2.6 feet, thereby resulting in the aforementioned masking of the close-in bottom structure.

This being the case, it will be apparent that whether or not the equivalent depth is subtracted from the depth sounder reading, the subject system allows viewing of the close-in structure by effectively moving upward or offsetting the rather broad zero line to a point where it no longer obscures the near-in returns from the water immediately beneath the hull of the vessel. This permits finding shallow water structure where, for instance, bedding bass reside. It also permits improved shallow water navigation for those who venture into extremely shallow water conditions.

What has been accomplished is that by a simple mechanism of acoustic delay equivalent to a time greater than the effective pulse length of the depth sounder plus transducer ring and settling time, it is now possible to off-set the indicated depth to bring the range of the depth sounder down to zero feet if such is desired, or at least down to some predetermined acceptable shallow depth response.

Note, that if some transducer ring, receiver settling time, or pulse length interference is acceptable, the delay need only be some significant fraction of the equivalent shallowest depth associated with the depth sounding system. It has been found that the transducer mounting in the water column is not at all critical; and, that rather than having the problems associated with the epoxy bonding the transducer to the inner surface of the hull, any type of mounting system, even suspension of the transducer within the water column provides exceptionally and surprisingly good results. What the water column achieves is not only the ability to provide for the acoustic delay for the off-set which allows zero depth readings, it also provides a convenient mounting method for transducers in that no critical epoxy or cementing steps are required.

All that is necessary is to maintain water within the pipe or conduit which is a relatively simple matter and may be solved by utilizing a fill hole. It will be appreciated that the pipe or tube is sealed to the hull of the boat so that the water does not run out of the column. If one desired, one could mount the tube or pipe at the stern of the vessel from the transom with a cap at the bottom of the tube and with the cap immersed in the surrounding water. Appropriate adjustment of the transducer in the tube, and the off-set for the depth sounder would be required if the bottom of the cap were not flush with the bottom of the vessel.

What has therefore been provided is a means of acoustically delaying the signal from the transducer for a time equal to or greater than the distance associated with the inherent delays in the depth sounder so that the depth sounder may operate normally and still be provided with a shallow water response not heretofore achievable through pulse shortening or power reduction techniques.

It will be appreciated that while it is desirable for digital depth sounders to subtract out the delay, this is not necessary for graphic fish finding displays, such as graph or chart recorders, liquid crystal displays and flasher type units. Because all of the transducer and receiver induced ringing and instabilities are limited to effectively occurring in the water tube or delay device, a clear view of the bottom can be obtained in shallow water. In this instance, it is the contour of the bottom adjacent the hull of the vessel which is important, as opposed to an absolute indication of the depth.

What has occurred is that while there will be a visual offset of absolute depth on the display, the delay moves the interference caused by transducer ringing and receiver settling time up and out of the way so that the water immediately under the hull is unmasked and a clear view can be obtained of the shallow water structure.

In summary, while it may be desirable to subtract out the offset, the subject invention permits shallow water depth finding regardless of offset subtraction as long as the delay engendered by the water column, or other device, removes the effects of transmit pulse length, receiver settling time and transducer ring.

Having above indicated a preferred embodiment of the present invention, it will occur to those skilled in the art that modifications and alternatives can be practiced within the spirit of the invention. It is accordingly intended to define the scope of the invention only as indicating in the following claims.

I claim:

1. Apparatus for use in an aquatic vessel for improving the shallow water response of a depth sounding system having a depth sounder for indicating the depth of water beneath said vessel and a transducer coupled to said depth sounder, comprising:

acoustic delay means interposed between the face of said transducer and the water at the bottom of the vessel for coupling acoustic energy for said transducer into the water beneath said vessel and for coupling return pulses to said transducer, said acoustic delay means being provided with a predetermined delay time that exceeds the time associated with transducer ring; and means for automatically subtracting from the indicated depth of the water from said depth sounder the depth added by the interposition of said delay means for permitting indication of shallow water depth.

2. The apparatus of claim 1 wherein said depth sounder includes receiver circuitry and wherein the receiver circuitry is non-responsive to returns within a predetermined blind zone, the depth of said blind zone being equal to or greater than the depth associated with said acoustic delay means.

3. The apparatus of claim 1 wherein said acoustic delay means includes a water column.

4. The apparatus of claim 2 wherein said depth sounder includes receiver circuitry non-responsive to returns within a predetermined blind zone and wherein the length of said water column is equal to the length associated with said blind zone.

5. The apparatus of claim 4 wherein the depth associated with said blind zone exceeds the depth associated with said water column, whereby a predetermined blind region can be established beneath the bottom of said vessel.

6. Apparatus for use with an aquatic vessel for improving the shallow water response of a depth sounding system having a depth sounder for indicating the depth of water beneath said vessel and a transducer coupled to said depth sounder, comprising:

acoustic delay means interposed in the acoustic transmission path between said depth sounder and the surface of the water for delaying acoustic energy transmitted to and from said depth sounder by an amount that exceeds the time associated with transducer ring; and means for automatically subtracting from the indicated depth from said depth sounder the depth added by the interposition of said delay means for permitting indication of shallow water depth.

7. An apparatus for use with an aquatic vessel for improving the shallow water response of a depth sounding system having a depth sounder for indicating the depth of water beneath said vessel and a transducer coupled to said depth sounder, said depth sounder including means for automatically subtracting from the indicated depth from said depth sounder the depth added by the interposition of an acoustic delay means, acoustic delay means interposed in first acoustic the transmission path between said depth sounder and the surface of the water for delaying acoustic energy transmitted to and from said depth sounder by an amount that exceeds the time associated with transducer ring.

* * * * *